United States Patent
Taylor et al.

(10) Patent No.: US 6,418,954 B1
(45) Date of Patent: Jul. 16, 2002

(54) SYSTEM AND METHOD FOR DIVIDING FLOW

(75) Inventors: Matthew Thomas Taylor; John Christopher Hallahan, both of San Jose, CA (US); William R. Clark, Hampstead, NH (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 09/836,748

(22) Filed: Apr. 17, 2001

(51) Int. Cl.[7] .............................................. G05D 11/13
(52) U.S. Cl. ................. 137/9; 137/101.19; 137/101.21; 137/118.04
(58) Field of Search ...................... 137/98, 100, 101.19, 137/101.21, 9, 118.04

(56) References Cited

U.S. PATENT DOCUMENTS

| | | |
|---|---|---|
| 1,767,588 A | 6/1930 | Hutton |
| 1,886,575 A | 11/1932 | O'Connor |
| 2,288,297 A | 6/1942 | Naiman |
| 2,314,152 A | 3/1943 | Mallory |
| 2,638,912 A | 5/1953 | Lee |
| 2,661,756 A | 12/1953 | Noon et al. |
| 2,780,414 A | 2/1957 | De Heer |
| 3,092,127 A | 6/1963 | Bracken |
| 3,438,385 A | 4/1969 | Nogami |
| 3,556,126 A | 1/1971 | Oswald et al. ............... 137/118 |
| 3,762,428 A | 10/1973 | Beck et al. .................... 137/88 |
| 4,369,031 A | 1/1983 | Goldman et al. ............. 432/198 |
| 5,165,450 A | 11/1992 | Marrelli ....................... 137/875 |
| 5,307,833 A | 5/1994 | Stoy et al. ................... 137/118 |
| 5,453,124 A | 9/1995 | Moslehi et al. ............. 118/715 |
| 5,927,321 A | 7/1999 | Bergamini ................ 137/487.5 |
| 6,333,272 B1 * | 12/2001 | McMillin et al. ............. 438/70 |

FOREIGN PATENT DOCUMENTS

GB 957055 5/1964

OTHER PUBLICATIONS

General Purpose Mass–Flo Controller (Type 1179A), MKS Instruments, Bulletin 1179A–3/00 (4 pages).
Types 246 & 247 Single & Four Channel Power Supply/Readout, MKS Instruments, 5/98 (2 pages).
Pressure/Flow Control Module (Type 250E), MKS Instruments, Bulletin 250–5/00 (4 pages).

* cited by examiner

Primary Examiner—Stephen Hepperle
(74) Attorney, Agent, or Firm—McDermott, Will & Emery

(57) ABSTRACT

A system for dividing a single flow of gas into two or more secondary flows of known, precise values, without requiring a high upstream pressure. The system includes an inlet for receiving the single gas flow, and first and second flow lines connected to the inlet. A mass flow meter measures gas flow through the first line and provides a signal indicative of the measured flow rate. A restrictor restricts gas flow through the first line to a desired flow rate, and has a smallest cross-sectional flow area selected to provide an upstream pressure high enough to allow the mass flow meter to operate properly and lower than a predetermined upper pressure limit. A mass flow controller receives the signal indicative of the measured flow rate from the mass flow meter and maintains a flow rate through the second line based on the signal.

19 Claims, 4 Drawing Sheets

SYSTEM AND METHOD FOR DIVIDING FLOW

FIELD OF DISCLOSURE

The present disclosure relates generally to semiconductor processing equipment and, more particularly, to a gas box for delivering contaminant-free, precisely metered quantities of process gases to semiconductor process chambers. Even more particularly, the present disclosure relates to a system and method for dividing flow from a single gas box among multiple process chambers.

BACKGROUND OF DISCLOSURE

The fabrication of semiconductor devices often requires the careful synchronization and precisely measured delivery of as many as a dozen gases to a process chamber. Various recipes are used in the fabrication process, and many discrete processing steps where a semiconductor device is cleaned, polished, oxidized, masked, etched, doped, metalized, etc., can be required. The steps used, their particular sequence and the materials involved all contribute to the making of particular devices.

Accordingly, wafer fabrication facilities are commonly organized to include areas in which chemical vapor deposition, plasma deposition, plasma etching, sputtering and other similar gas manufacturing processes are carried out. The processing tools, be they chemical vapor deposition reactors, vacuum sputtering machines, plasma etchers or plasma enhanced chemical vapor deposition, must be supplied with various process gases. Pure gases must be supplied to the tools in contaminant-free, precisely metered quantities.

In a typical wafer fabrication facility the gases are stored in tanks, which are connected via piping or conduit to a gas box. The gas box delivers contaminant-free, precisely metered quantities of pure inert or reactant gases from the tanks of the fabrication facility to a process tool. The gas box, or gas metering system includes a plurality of gas paths having gas metering units, such as valves, pressure regulators and transducers, mass flow controllers and filters/purifiers. Each gas path has its own inlet for connection to separate sources of gas, but all of the gas paths converge into a single outlet for connection to the process tool.

Sometimes dividing the combined process gases among multiple process chambers is desired. In such cases, the single outlet of the gas box is connected to multiple process chambers through secondary flow paths. To insure that the primary flow of the outlet of the gas box is divided equally among the secondary flow paths, flow restrictors are placed in each secondary flow path. Such a technique of dividing flow, however, requires that pressure upstream of the secondary flow paths be kept relatively high (e.g., 30 to 45 PSIA). Otherwise, the technique may not be as accurate when the upstream pressure needs to be kept lower (e.g., less than 15 PSIA) for safety or other reasons.

What is still desired, therefore, is a system and method for dividing a single flow of gas into two or more secondary flows of known, precise values, without requiring a high upstream pressure.

SUMMARY OF DISCLOSURE

Accordingly, the present disclosure provides a system for dividing a single flow of gas into two or more secondary flows of known, precise values, without requiring a high upstream pressure. The system includes an inlet for receiving the single gas flow, and first and second flow lines connected to the inlet. A mass flow meter measures gas flow through the first line and provides a signal indicative of the measured flow rate. A restrictor restricts gas flow through the first line to a desired flow rate, and has a smallest cross-sectional flow area selected to provide an upstream pressure high enough to allow the mass flow meter to operate properly and lower than a predetermined upper pressure limit. The system also has a mass flow controller controlling gas flow through the second line. The mass flow controller receives the signal indicative of the measured flow rate from the mass flow meter and maintains a flow rate through the second line based on the signal.

According to one aspect of the present disclosure, the smallest cross-sectional flow area of the restrictor is selected such that the predetermined upper pressure limit is equal to about 15 PSIA. According to another aspect, the mass flow meter and the mass flow controller are provided with the same flow range.

According to another aspect of the present disclosure, the mass flow controller maintains a flow rate through the second line substantially equal to the measured flow rate of the first line. According to an additional aspect, the system also includes a controller for proportionally adjusting the signal indicative of the measured flow rate from the mass flow meter prior to the signal being received by the mass flow controller, such that the mass flow controller maintains a flow rate through the second line substantially equal to a predetermined ratio of the measured flow rate of the first line.

According to an additional aspect, the system further includes at least a third flow line connected to the inlet, and a mass flow controller controlling gas flow through the third line. The mass flow controller of the third line receives the signal indicative of the measured flow rate from the mass flow meter and maintains a flow rate through the third line based on the signal. According to still another aspect, the system includes at least one controller for proportionally adjusting the signal indicative of the measured flow rate from the mass flow meter prior to the signal being received by the mass flow controllers, such that the mass flow controllers maintain flow rates through the second and the third lines substantially equal to a predetermined ratio of the measured flow rate of the first line.

These and other features and advantages of the present disclosure will become more apparent to those of ordinary skill in the art after reading the following detailed description of the preferred embodiments, which are illustrated in the attached drawing figures.

DETAILED DESCRIPTION OF DISCLOSURE

Figure 1:
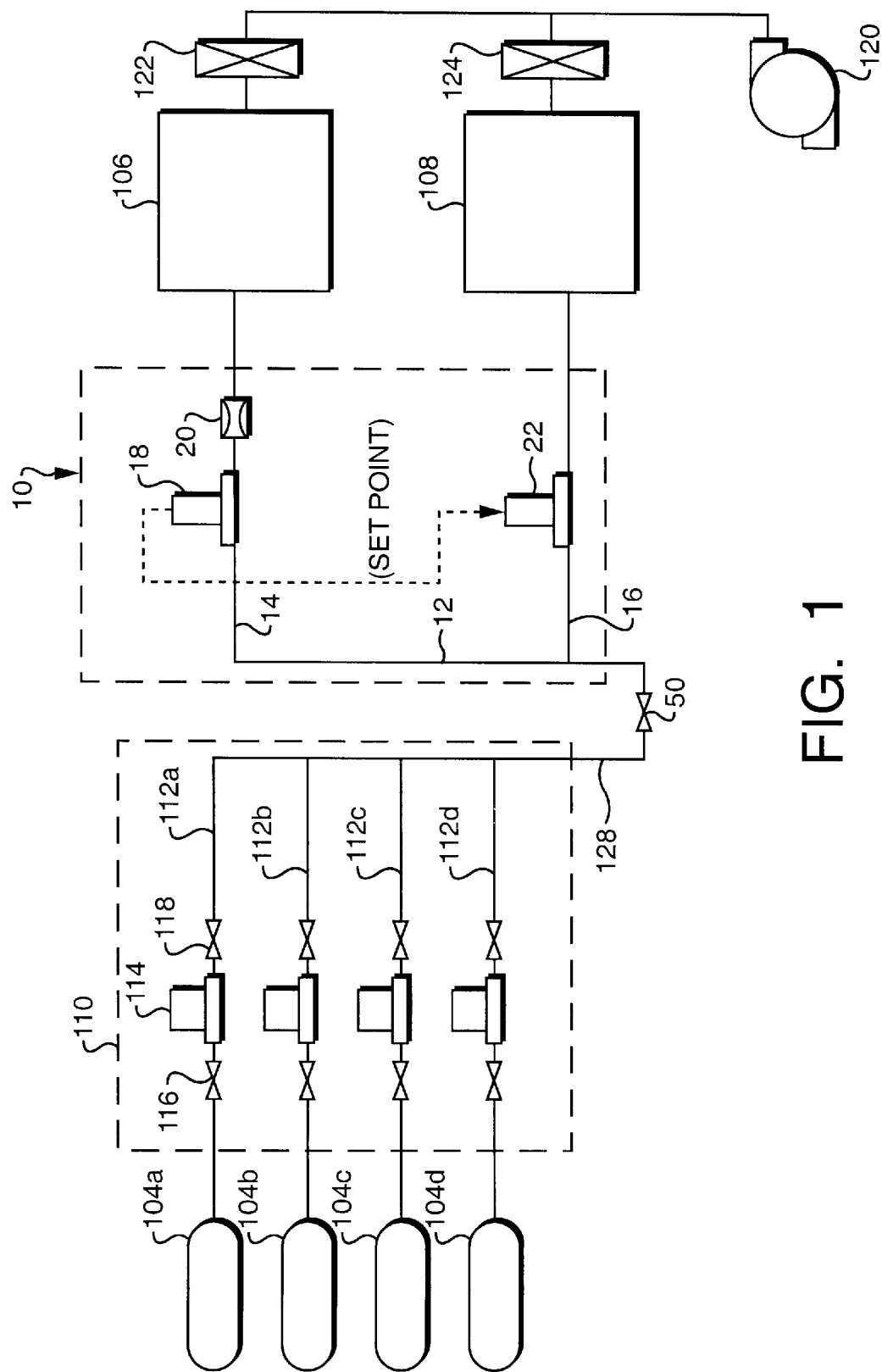
FIG. 1 is a schematic illustration of sources of process gas connected to two process chambers through a gas metering box and a flow divider system constructed in accordance with the present disclosure.

Referring to FIG. 1, the present disclosure provides a system and method of dividing flow between at least two flow paths. The system and method are particularly intended for use with gas metering systems for delivering contaminant-free, precisely metered quantities of process and purge gases to semiconductor process chambers. The presently disclosed system and method provide the benefit of dividing a single flow of gas into two or more secondary flows of known, precise values, without requiring a relatively high upstream pressure.

Figure 4:
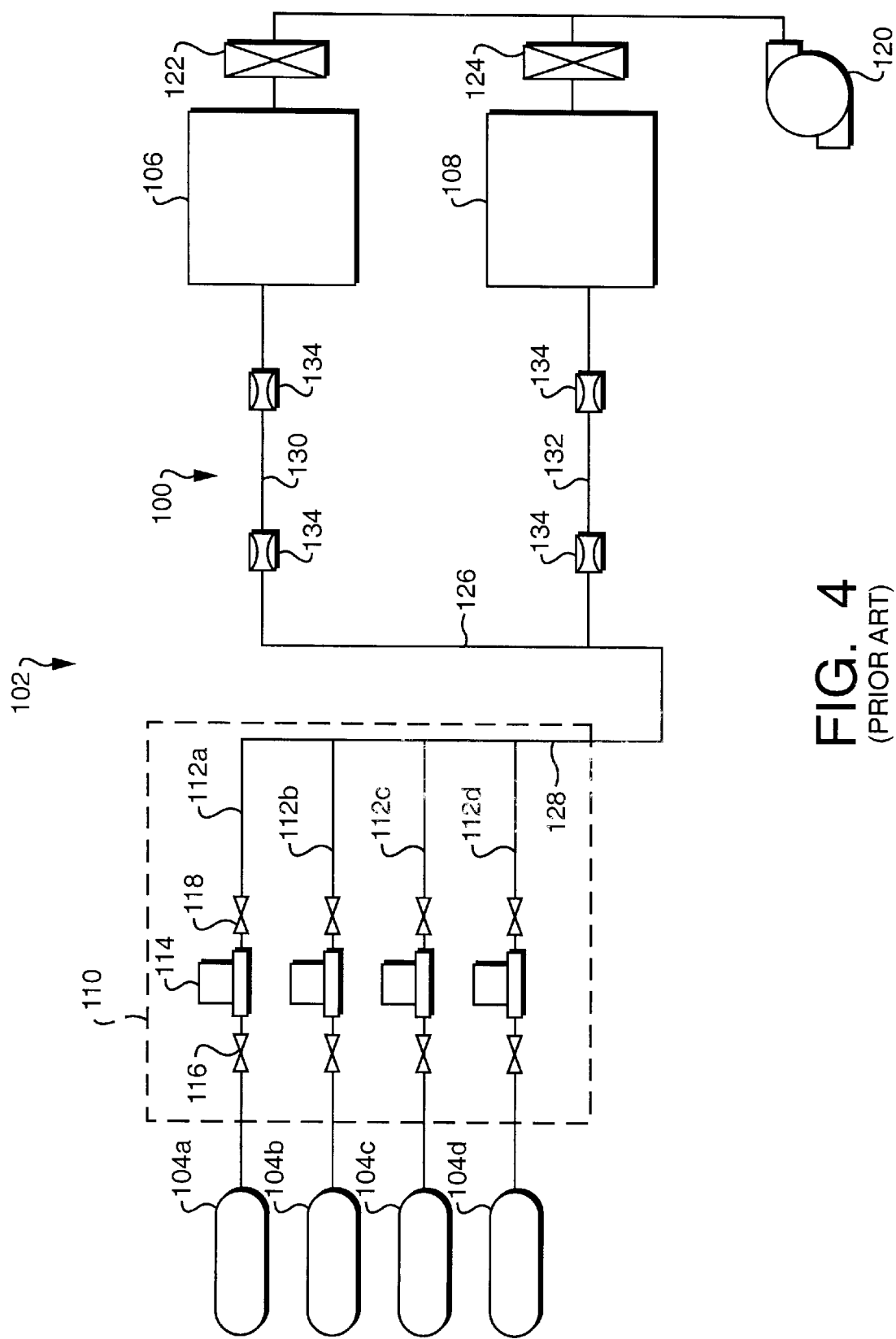
FIG. 4 is a schematic illustration of sources of process gas connected to two process chambers through a gas metering box and two flow paths constructed in accordance with the prior art.

Referring first to FIG. 4, however, a system 100 for dividing flow according to the prior art is shown. The system 100 is incorporated in a gas metering system 102 that receives multiple gases, including both process gases and a purge gas, from gas supplies (e.g., gas tanks) 104a, 104b, 104c, 104d and then precisely meters the gases to two process chambers 106, 108 (alternatively, the gases can be metered to different injectors or areas of a single process chamber). The gas metering system 102 includes a gas box 110 having a plurality of gas sticks 112a, 112b, 112c, 112d (while four sticks are shown, the gas box can include more or less than four). Each stick includes, for example, a mass flow controller (MFC) 114, a valve 116 positioned before the MFC and a valve 118 positioned after the MFC. The gas sticks 112a, 112b, 112c, 112d are separately connected to the gas sources 104a, 104b, 104c, 104d and provide controllable gas passageways so that a contaminant-free, precisely metered amount of a gas, or combination of gases, can be supplied from the gas metering system 102 to the process chambers 106, 108. Although not shown, the sticks 112a, 112b, 112c, 112d can also each be provided with other components for monitoring or controlling gases, such as filters, purifiers, and pressure transducers and controllers. The sticks 112a, 112b, 112c, 112d connect together, in an outlet manifold 128 for example, to allow the gas flows from each stick to be mixed if desired prior to leaving the gas box. A vacuum pump 120 is connected to the process chambers 106, 108 through gate valves 122, 124. During operation the vacuum pump 120 draws gas from the gas sources 104a, 104b, 104c, 104d, through the gas metering system 102 and into the process chambers 106, 108.

The prior art system 100 for dividing flow between the at least two process chambers 106, 108 includes an inlet manifold, or line 126 connected to the outlet manifold 128 of the gas box 110, first and second flow lines 130, 132 extending from the inlet 126 to the process chambers 106, 108, and restrictors 134 placed in each flow line.

In order to accurately control the flow rates through the first and the second lines 130, 132, the smallest cross-sectional flow area (e.g., diameter) of the restrictors 134 must be larger than any other restrictions in the first and the second flow lines 130, 132. Because restrictors 134 are used to control the flow rates, the upstream pressure (i.e., the pressure of the gas delivery system 102 prior to the flow dividing system 100) must be kept relatively high (e.g., 30 to 40 PSIA). Thus, in situations where it is preferable to keep the upstream pressure relatively low (e.g., 15 PSIA or less), for safety or other reasons, the system 100 of the prior art is not accurate in dividing and regulating flow. Furthermore, it is not possible to change the flow ratios between the flow lines 130, 132 without changing the restrictors 134, which can cause system downtime.

Referring back to FIG. 1, a flow dividing system 10 according to the present disclosure includes an inlet line or manifold 12 for receiving the single gas flow from the outlet manifold 128 of the gas box 110, and first and second flow lines 14, 16 connected to the inlet 12. A mass flow meter 18 measures gas flow through the first line 14 and provides a signal indicative of the measured flow rate. A restrictor 20 restricts gas flow through the first line 14 to a desired flow rate, and has a smallest cross-sectional flow area selected to provide an upstream pressure high enough to allow the mass flow meter 18 to operate properly and lower than a predetermined upper pressure limit. The system also has a mass flow controller 22 controlling gas flow through the second line 16. The mass flow controller 22 receives the signal indicative of the measured flow rate from the mass flow meter 18 and maintains a flow rate through the second line 16 based on the signal.

Preferably, the smallest cross-sectional flow area of the restrictor 20 is selected such that the predetermined upper pressure limit is equal to about 15 PSIA. In addition, the mass flow meter 18 and the mass flow controller 22 are preferably provided with the same flow range.

In the flow dividing system 10 of FIG. 1, the mass flow controller 22 maintains a flow rate through the second line 16 substantially equal to the measured flow rate of the first line 14. Although not shown, the flow divider system 10 can be provided with more than two flow lines, with each additional flow line having a flow controller receiving its set point from the flow meter 18 of the first flow line 14.

Figure 2:
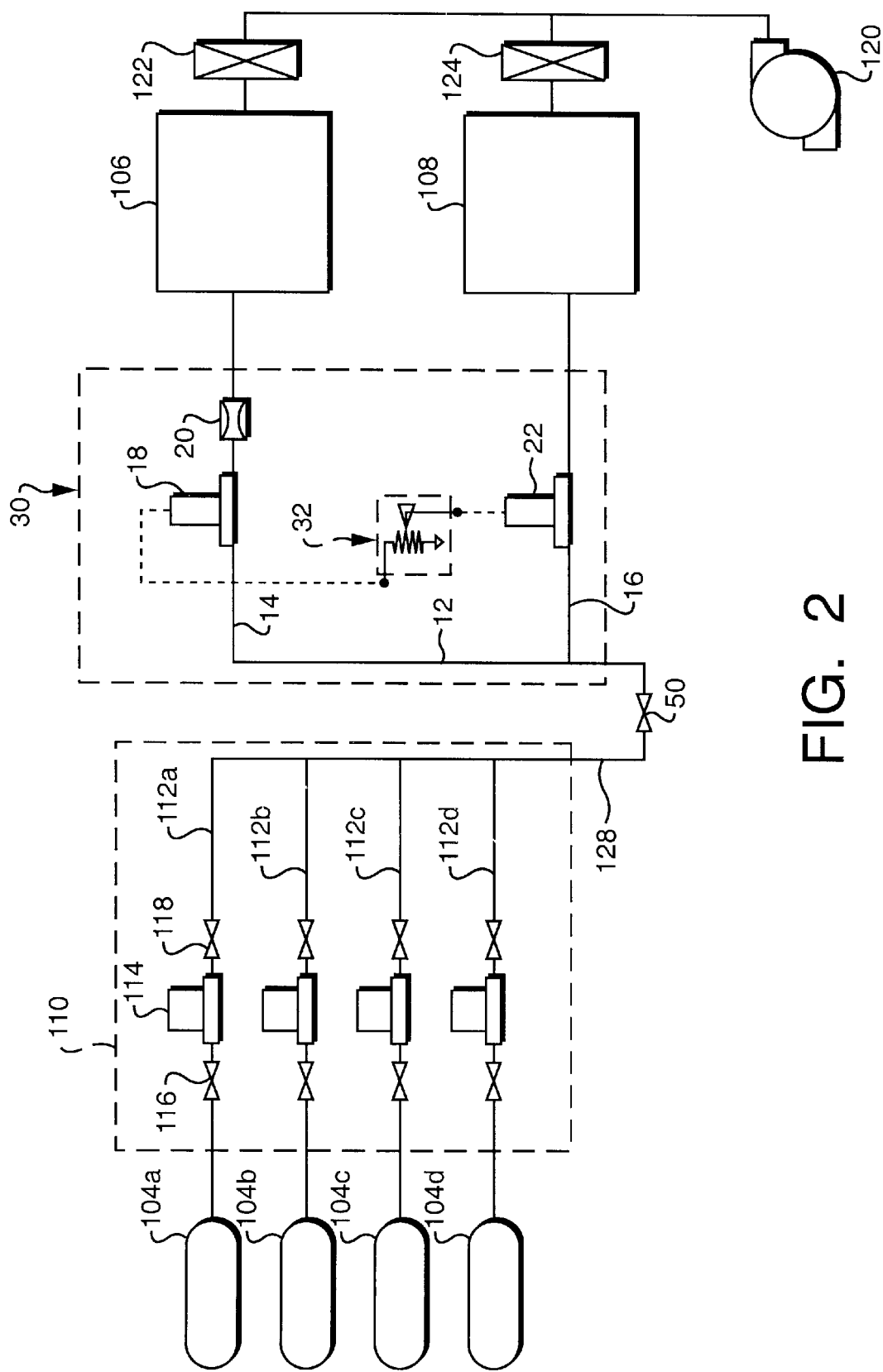
FIG. 2 is a schematic illustration of sources of process gas connected to two process chambers through a gas metering box and another flow divider system constructed in accordance with the present disclosure.

Referring to FIG. 2, another flow divider system 30 constructed in accordance with the present disclosure is shown. The systems 10, 30 of FIGS. 1 and 2, respectively, are similar and elements that are the same have the same reference characters. The system 30 of FIG. 2 also includes a controller 32 for proportionally adjusting the signal indicative of the measured flow rate from the mass flow meter 18 prior to the signal being received by the mass flow controller 22, such that the mass flow controller 22 maintains a flow rate through the second line 16 substantially equal to a predetermined ratio of the measured flow rate of the first line 14.

Figure 3:
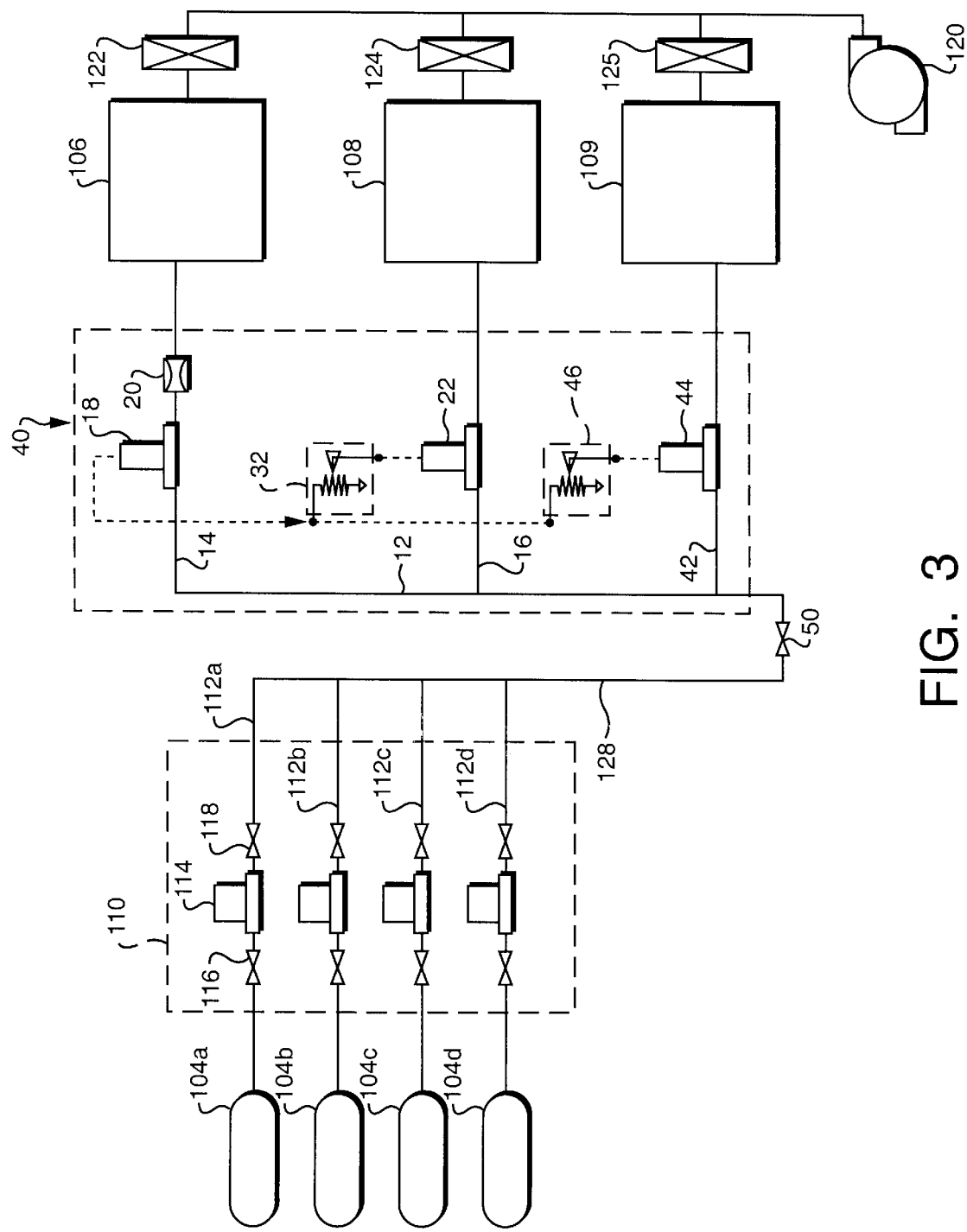
FIG. 3 is a schematic illustration of sources of process gas connected to three process chambers through a gas metering box and an additional flow divider system constructed in accordance with the present disclosure.

Referring to FIG. 3, another flow divider system 40 constructed in accordance with the present disclosure is shown. The systems 30, 40, respectively, of FIGS. 2 and 3 are similar and elements that are the same have the same reference characters. The system 40 of FIG. 3 further includes at least a third flow line 42 connected to the inlet 12, and a mass flow controller 46 controlling gas flow through the third line 42. As shown the third line 42 can be connected to a third process chamber 109 having its own gate valve 125.

The mass flow controller 44 of the third line 42 receives the signal indicative of the measured flow rate from the mass flow meter 18 and maintains a flow rate through the third line 42 based on the signal. The system 40 includes a second controller 46 for proportionally adjusting the signal indicative of the measured flow rate from the mass flow meter 18 prior to the signal being received by the mass flow controller 44 of the third line 42, such that the mass flow controllers 22, 44 maintain flow rates through the second and the third lines 16, 42 substantially equal to a predetermined ratio of the measured flow rate of the first line 14.

Examples of suitable mass flow meters 18 and mass flow controllers 22, 44 for use with the flow dividing systems 10, 30, 40 of the present disclosure are Mass-Flo® brand controllers available from MKS Instruments of Andover, MA (http://www.mksinst.com). In particular, the Type 1179A Mass-Flo® brand controller is preferred. Types 246 and 247 single and four channel power supply/readout control modules can be utilized as the controllers 32, 46 for proportionally controlling the flow rate set points for the flow controllers 22, 44 of the second and third flow lines 16, 42. Although not shown, it is envisioned that the disclosed systems 10, 30, 40 can be provided as modular units for quick and easy assembly between a gas box 110 and process chamber(s) 106, 108, 109. In such a case, a shut-off valve or suitable connector 50 might be provided between the inlet manifold 12 of the flow divider systems and the outlet manifold 128 of the gas box 110.

While there have been illustrated and described particular embodiments of the present disclosure, it will be appreciated that numerous changes and modifications will occur to those skilled in the art. Accordingly, it is intended that the appended claims cover all those changes and modifications which fall within the true spirit and scope of the present disclosure.

What is claimed is:

1. A system for dividing a single flow of gas into two or more secondary flows of known, precise values without requiring a high upstream pressure, comprising:
    an inlet for receiving the single flow of gas;
    a first flow line connected to the inlet;
    a second flow line connected to the inlet;
    a mass flow meter measuring gas flow through the first line and providing a signal indicative of the measured flow rate;
    a restrictor restricting gas flow through the first line to a desired flow rate, the restrictor having a smallest cross-sectional flow area selected to provide an upstream pressure high enough to allow the mass flow meter to operate properly and lower than a predetermined upper pressure limit; and
    a mass flow controller controlling gas flow through the second line, the mass flow controller receiving the signal indicative of the measured flow rate from the mass flow meter and maintaining a flow rate through the second line based on the signal.

2. A system according to claim 1, wherein the mass flow meter and the mass flow controller are provided with the same flow range.

3. A system according to claim 1, wherein the predetermined upper pressure limit is equal to about 15 PSIA.

4. A system according to claim 1, wherein the mass flow controller maintains a flow rate through the second line substantially equal to the measured flow rate of the first line.

5. A system according to claim 1, further comprising a controller for proportionally adjusting the signal indicative of the measured flow rate from the mass flow meter prior to the signal being received by the mass flow controller such that the mass flow controller maintains a flow rate through the second line substantially equal to a predetermined ratio of the measured flow rate of the first line.

6. A system according to claim 1, further comprising:
    at least a third flow line connected to the inlet; and
    a mass flow controller controlling gas flow through the third line, the mass flow controller receiving the signal indicative of the measured flow rate from the mass flow meter and maintaining a flow rate through the third line based on the signal.

7. A system according to claim 6, wherein the mass flow controllers maintain flow rates through the second and the third lines substantially equal to the measured flow rate of the first line.

8. A system according to claim 6, further comprising at least one controller for proportionally adjusting the signal indicative of the measured flow rate from the mass flow meter prior to the signal being received by the mass flow controllers such that the mass flow controllers maintain flow rates through the second and the third lines substantially equal to a predetermined ratio of the measured flow rate of the first line.

9. A system according to claim 8, wherein the signal indicative of the measured flow rate from the mass flow meter is adjusted such that the mass flow controllers maintain substantially equal flow rates through the second and the third lines.

10. A method for dividing a single flow of gas into two or more secondary flows of known, precise values, without requiring a high upstream pressure, comprising:
    receiving the single flow in to an inlet;
    connecting a first flow line to the inlet;
    connecting a second flow line to the inlet;
    restricting gas flow through the first line to a desired flow rate so that an upstream pressure is lower than a predetermined upper pressure limit;
    measuring gas flow through the first line; and
    maintaining a flow rate through the second line based on the measured gas flow through the first line.

11. A method according to claim 10, wherein the predetermined upper pressure limit is equal to about 15 PSIA.

12. A method according to claim 10, wherein the flow rate through the second line is maintained substantially equal to the measured flow rate of the first line.

13. A method according to claim 11, wherein the flow rate through the second line is maintained at a predetermined ratio of the measured flow rate of the first line.

14. A method for dividing a single flow of gas into two or more secondary flows of known, precise values, without requiring a high upstream pressure, comprising:
    receiving the single flow in to an inlet;
    connecting a first flow line to the inlet;
    connecting a second flow line to the inlet;
    connecting at least a third flow line to the inlet;
    restricting gas flow through the first flow line to a desired flow rate so that an upstream pressure is lower than a predetermined upper pressure limit;
    measuring gas flow through the first line; and
    maintaining a flow rate through the second and the third flow lines based on the measured gas flow through the first line.

15. A method according to claim 14, wherein the predetermined upper pressure limit is equal to about 15 PSIA.

16. A method according to claim 14, wherein the flow rates through the second and the third flow lines are maintained substantially equal to the measured flow rate of the first line.

17. A method according to claim 16, wherein the flow rates through the second and the third flow lines are maintained at predetermined ratios of the measured flow rate of the first line.

18. A method according to claim 17, wherein substantially equal flow rates are maintained through the second and the third lines.

19. A method according to claim 17, wherein the predetermined ratios are selected through a single controller.

* * * * *